United States Patent [19]

Stainton

[11] Patent Number: 4,899,607
[45] Date of Patent: Feb. 13, 1990

[54] ELECTRICALLY CONTROLLED PRESSURIZED FLUID ACTUATED X-Y SHIFTING MECHANISM

[75] Inventor: John E. Stainton, Euxton, England

[73] Assignee: Eaton Corporation, Cleveland, Ohio

[21] Appl. No.: 261,454

[22] Filed: Oct. 24, 1988

[30] Foreign Application Priority Data

Nov. 5, 1987 [GB] United Kingdom ............... 8725981

[51] Int. Cl.⁴ .................... F16H 5/78; F16H 5/80; G05G 9/12
[52] U.S. Cl. ................................... 74/335; 74/364; 74/365; 74/473 R
[58] Field of Search ............... 74/335, 336 R, 336.5, 74/364, 365, 473 R

[56] References Cited

U.S. PATENT DOCUMENTS

| | | | |
|---|---|---|---|
| 2,137,953 | 11/1938 | Rowley | 74/335 X |
| 2,931,237 | 4/1960 | Backus | 74/335 |
| 2,951,392 | 9/1960 | Backus | 74/473 |
| 3,039,321 | 6/1962 | Weymann | 74/336.5 |
| 3,093,008 | 6/1963 | Wight | 74/335 |
| 3,433,101 | 3/1969 | Scholl et al. | 74/365 X |
| 3,793,898 | 2/1974 | Espenschield et al. | 74/335 |
| 4,275,612 | 6/1981 | Silvester | 74/473 R |
| 4,455,883 | 6/1984 | Radcliffe | 74/473 R X |
| 4,515,029 | 5/1985 | Reynolds et al. | 74/473 R X |
| 4,567,785 | 2/1986 | Reynolds et al. | 74/477 |
| 4,580,457 | 4/1986 | Ishida et al. | 74/335 |
| 4,584,895 | 4/1986 | Holmes | 74/473 R X |
| 4,690,008 | 9/1987 | Klatt | 74/336 R |

Primary Examiner—Allan D. Herrmann
Attorney, Agent, or Firm—H. D. Gordon

[57] ABSTRACT

An electrically controlled, fluidly actuated X-Y type shifting mechanism (30) for cooperation with a mechanical change gear transmission shift bar housing assembly (10) normally controlled by a manual shift lever is provided. The mechanism (30) includes a housing (32) having a single pressurized fluid connection (52) and a single electrical connection assembly (50) which is mounted to a shift bar housing assembly normally receiving a shift lever lower. A shift finger (38) extends into the shift bar housing for cooperation with the shift rail (12, 14, 16) shift blocks (24, 26, 28) and is positioned by two transversely mounted, axially movable shafts (68, 110). Each of shafts is axially positioned in a selected one of three selectable axial position by piston/-cylinder assemblies (46, 42) controlled by six three-way, two-position electrically operated valves (150, 152, 154, 156, 158, 160).

10 Claims, 4 Drawing Sheets

ELECTRICALLY CONTROLLED PRESSURIZED FLUID ACTUATED X-Y SHIFTING MECHANISM

BACKGROUND OF THE INVENTION

1. Field of the Invention

The present invention relates to a shifting mechanism of the "X-Y type" for cooperation with a shift bar housing assembly for selectively shifting a change gear mechanical transmission. In particular, the present invention relates to an electrically controlled, pressurized fluid actuated X-Y shifting mechanism which is effective to cooperate with a substantially standard shift bar housing assembly of the type normally manually controlled by a shift lever allowing for the automatic or semi-automatic shifting operation of an otherwise substantially standard normally manually shifted mechanical transmission.

2. Description of the Prior Art

Shift bar housing assemblies for mechanical change gear transmissions comprising a plurality of generally parallel, independently axially movable shift bars or shift rails, each carrying a shift fork fixed thereto, and shift block mechanisms allowing a single shift bar to be selected and axially moved to effect engagement/disengagement of a particular gear ratio are well known in the prior art as may be seen by reference to U.S. Pat. Nos. 2,951,392; 4,455,883; 4,515,029; 4,567,785 and 4,584,895, the disclosures of all of which are hereby incorporated by reference.

Typically, such shift bar housings are manually controlled and operated by a shift finger fixed to a directly mounted shift lever or to the cross shaft of a remotely controlled shifting mechanism. Interlock mechanisms are usually provided to prevent movement of more than one shift rail at a time from the axially centered or neutral positions thereof.

Automatically controlled X-Y type shifting mechanisms wherein a shift finger is automatically moved in the X or rail selection direction and then in the Y or gear engagement/disengagement direction are known in the prior art as may be seen by reference to U.S. Pat. No. 2,931,237, the disclosure of which is hereby incorporated by reference.

Shift bar housing assemblies utilizing pressurized fluid actuated pistons and the like to control each shift rail in an automatic or semi-automatic mechanical transmission are known in the prior art as may be seen by reference to U.S. Pat. No. 4,445,393.

The prior art shifting mechanisms for providing automatic and/or semi-automatic shifting of mechanical change gear transmissions normally utilized with direct and/or remote manual shifting mechanisms were not totally satisfactory as substantial modification of the standard shift bar housing assembly was required, complicated valving and/or fluid/electrical connections were required, the controls were complicated and/or expensive to manufacture, assemble and/or repair, the devices did not retain the currently engaged gear in engagement if the electrical/pressurized fluid sources were interrupted, and/or the controls did not provide a rapidly and positively obtainable neutral position and a reliable indication device therefor.

SUMMARY OF THE INVENTION

In accordance with the present invention, the drawbacks of the prior art have been minimized or overcome by the provision of a relatively simple and reliable X-Y shifting mechanism which is easily connectable to electric and pressurized fluid sources and is compatible with the shift bar housing assemblies of normally manually shifted mechanical transmissions with little or no modifications thereto. The X-Y shifting mechanism of the present invention provides a rapidly and positively obtainable neutral position and includes a sensor to verify obtaining of neutral. Additionally, maintaining in gear and neutral positioning does not rely upon maintaining differential pressures, accordingly the transmission will retain its current in gear or neutral position in the event of an electric or pressurized fluid power failure.

The above is accomplished by providing an X-Y shifting mechanism which will bolt onto a standard shift bar housing at the same opening normally receiving a shift lever tower mechanism (see U.S. Pat. No. 3,850,047, the disclosure of which is hereby incorporated by reference) and from which extends a shift finger substantially identical to that associated with a manually controlled shift lever.

The X-Y shift mechanism is preferably electrically controlled and pressurized fluid, preferably pressurized air from a vehicular onboard air system, actuated and requires only a single electric and a single pressurized fluid connection thereto.

The single pressurized fluid connection connects to a common gallery which is connected to six three-way two-position valves, such a solenoid controlled valves, which supply fluid to, or exhaust fluid from, two transversely oriented three-position piston/cylinder assemblies. One of the pistons moves or pivots the shift finger in the X direction to align the shift finger with a selected shift rail while the other piston moves the shift finger in the Y direction for desired axial movement of the selected shift rail.

Accordingly, it is an object of the present invention to provide a new and improved electrically controlled, pressurized fluid actuated, X-Y shift mechanism for a mechanical transmission.

This and other objects and advantages of the present invention will become apparent from a reading of the description of the preferred embodiment taken in view of the attached drawings.

DESCRIPTION OF THE PREFERRED EMBODIMENT

Figure 1:
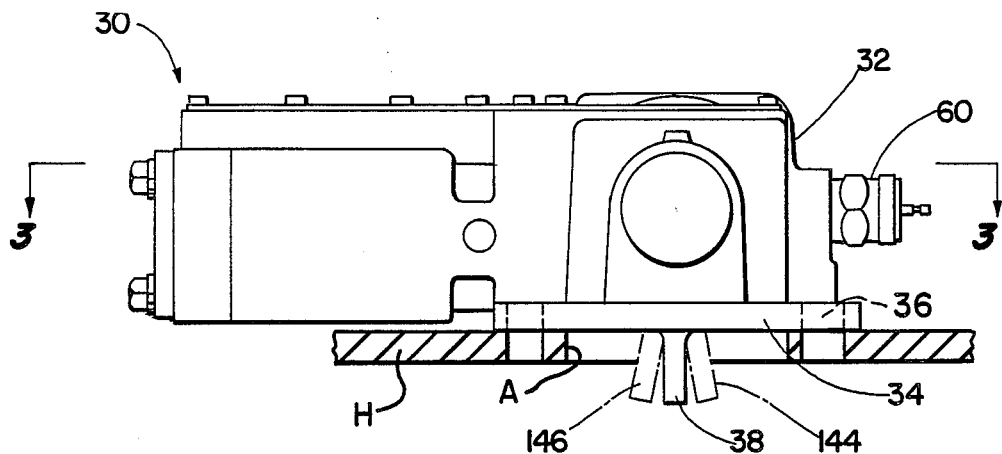
FIG. 1 is a front view of the X-Y shifting mechanism of the present invention.
Figure 2:
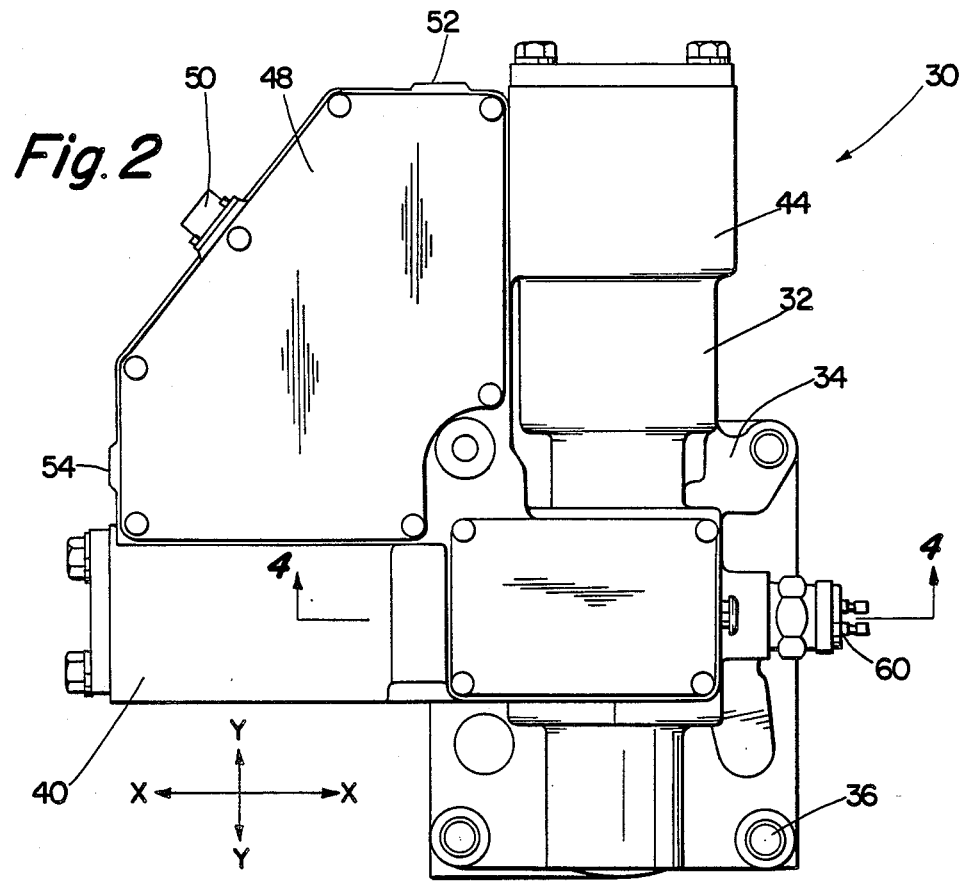
FIG. 2 is a top view of the X-Y shifting mechanism of the present invention.

In this disclosure, certain terminology will be used for convenience in reference only and will not be limiting. For example, the terms "forward" and "rearward" will refer to directions forward and rearward of the vehicle in which the transmission is installed. The terms "rightward", "leftward", "upward" and "downward" will refer to directions as taken in the drawings in connection with which the terminology is used. The terms "inward" and "outward" will refer to directions forward and away from, respectively, the geometric center of the apparatus. The terms "pivot" and "rotate" as used herein will both refer to movement of a specified object about an axis. The foregoing applies to normal derivatives of the above mentioned terms and terms of similar import.

Change gear heavy duty truck mechanical transmissions are well known in the prior art as may be seen by reference to U.S. Pat. No. 3,105,395 hereby incorporated by reference. First class lever mechanisms for directly shifting such change gear transmissions are well known in the art as may be seen by reference to U.S. Pat. Nos. 3,934,485 and 4,022,077, hereby both incorporated by reference. Remote controls for shifting transmissions of this type are also well known in the art as may be seen by reference to U.S. Pat. Nos. 2,040,549; 4,104,929 or 4,157,740 and 4,206,826, all hereby incorporated by reference. Such transmissions typically included a shift bar housing assembly an example of which may be seen schematically in FIG. 5. The shift bar housing assembly 10 typically comprises a plurality of axially movable shift rails, 12, 14 and 16, each of which carry a shift fork 18, 20 and 22, respectively, fixed thereto for axial movement therewith. As is well known, the shift forks are each associated with a positive clutch mechanism for selectively engaging/disengaging a first and/or a second gear to a shaft.

Typically, shifting of such transmissions is accomplished by selecting a shift rail by moving an engagement member such as a shift finger axially or pivotably along the axis X—X into alignment with a shift block or notch 24, 26 or 28 carried by the selected shift rail and then causing axial movement of the selected shift rail by axially moving or pivoting the shift finger to apply an axial force in the direction of axis Y—Y. In a typical manual transmission, the above is accomplished by utilization of a first class lever which could be pivoted in the directions of axes X—X and Y—Y or by utilization of a shift shaft carrying a shift finger thereon which was axially movable in the direction of axis X—X and then pivotably movable about the axis X—X to apply an axial force in the direction of the axis Y—Y.

In the case of directly shifted transmission, the remote end of a shifting mechanism, in the prior art typically a first class lever, was utilized to align with and then apply an axial force to the shift block or slot member carried by a selected shift rail while in the case of remotely shifted transmission a torque arm having one end thereof fixed for rotation and axial movement with the shift shaft was typically utilized to apply a selective axial and rotational movement to a shift finger carried for movement with the shift shaft.

Figure 5:
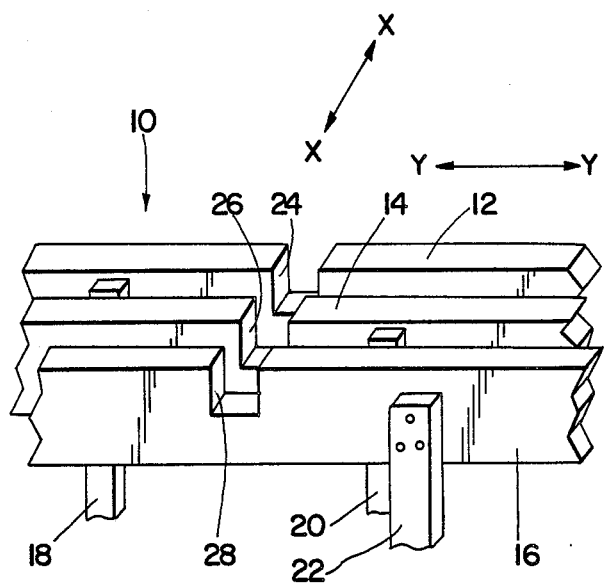
FIG. 5 is a schematic illustration of a portion of mechanical transmission shift bar housing assembly of the type suited for control with the X-Y shifting mechanism of the present invention.

It is with the type of shift bar housing assembly 10 illustrated in FIG. 5 and normally controlled by a manual shift lever or the like that the X-Y shifter 30 of the present invention is advantageous utilized to provide automatic or semi-automatic operation of a mechanical transmission.

Automatic and semi-automatic mechanical transmissions based upon generally standard mechanical transmissions provided with electric/pneumatic actuators controlled by a control unit are well known in the prior art as may be seen by reference to U.S. Pat. Nos. 4,648,290 and 4,361,060, the disclosures of which are hereby incorporated by reference.

X-Y shifting mechanism 30 is enclosed within a housing 32 having a mounting plate portion 34 with bolt bores 36 in a pattern allowing the mechanism 30 to be mounted at the upper opening A in a transmission shift bar housing H normally receiving the shift tower. A shift finger 38 extends downwardly from housing 32 for interaction with the shift rails.

Figure 3:
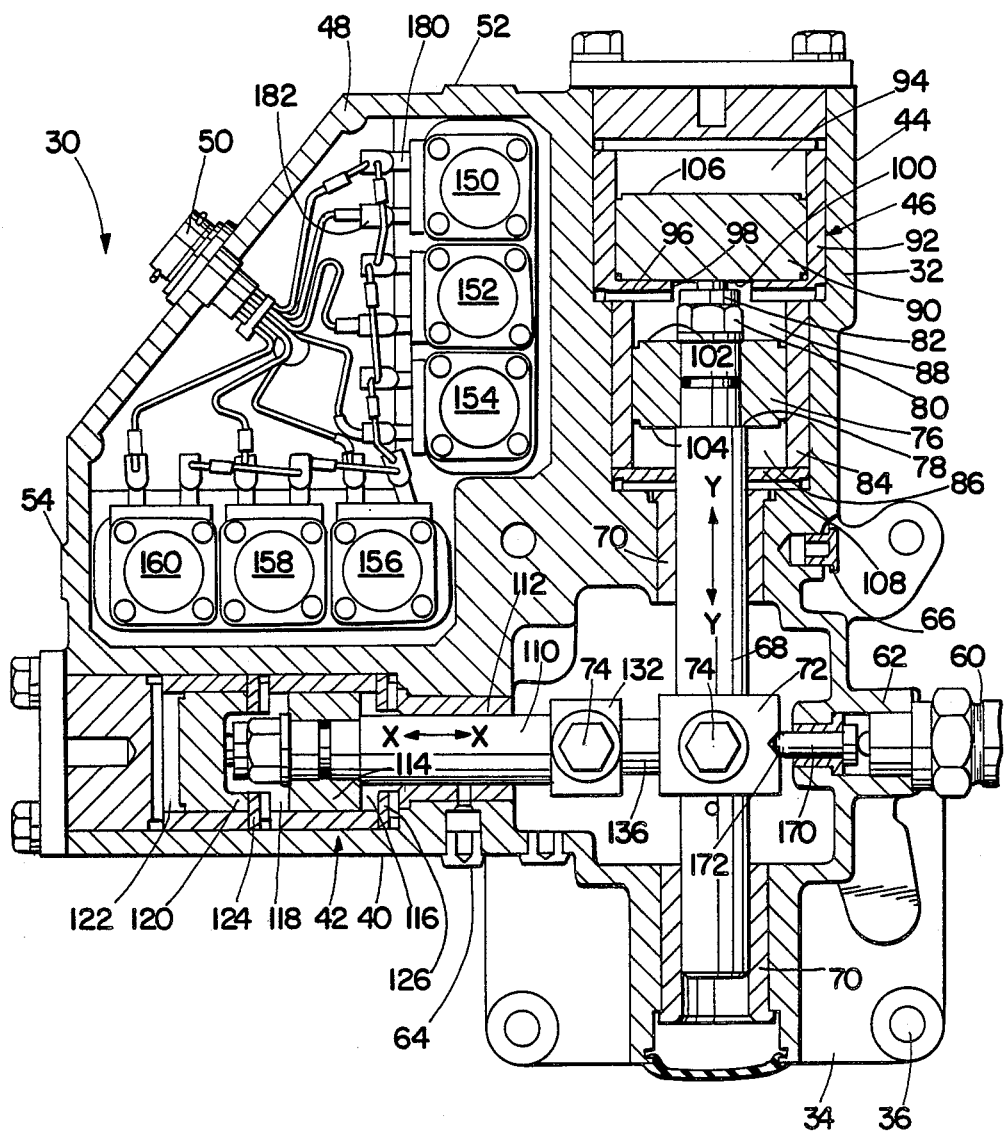
FIG. 3 is a sectional view of the X-Y shifting mechanism of the present invention taken substantially along line 3—3 in FIG. 1.

Housing 32 includes a portion 40 enclosing the select piston/cylinder assembly 42 for moving shift finger, axially or pivotably, in the direction of line X—X for selection of a selected shift rail, 12, 14 or 16; and a transversely extending portion 44 enclosing piston/cylinder assembly 46 for moving shift finger 38 in the direction of line Y—Y to cause axial movement of the selected shift rail and its associated shift fork for engaging or disengaging a selected transmission ratio gear. As is illustrated in FIG. 3, piston/cylinder assembly 46 is larger than piston/cylinder assembly 42 as moving shift finger 38 in the engagement, i.e. Y—Y, direction requires greater force than moving shift finger 38 in the selection, i.e. X—X, direction. Housing 32 also includes a valving portion 48 defining a single multiple pin electric connector 50, a single inlet 52 for connection to a source of pressurized fluid, such as a regulated, dried, filtered connection to the onboard vehicle air system, and a pressurized fluid exhaust to atmosphere 54. The valving portion 48 also contains the valves for controlling the X—X and Y—Y piston/cylinder assemblies, 42 and 46, respectively, a common pressurized fluid gallery 56 fluidly connected to inlet 52 and a common exhaust gallery 58 fluidly connected to the exhaust outlet 54. Housing 32 also defines a connector 60 for a neutral position sensor 62 and a pair of breather plugs 64 and 66 for the piston/cylinder assemblies. Other vent or breather plugs may be provided as necessary.

Figure 4:
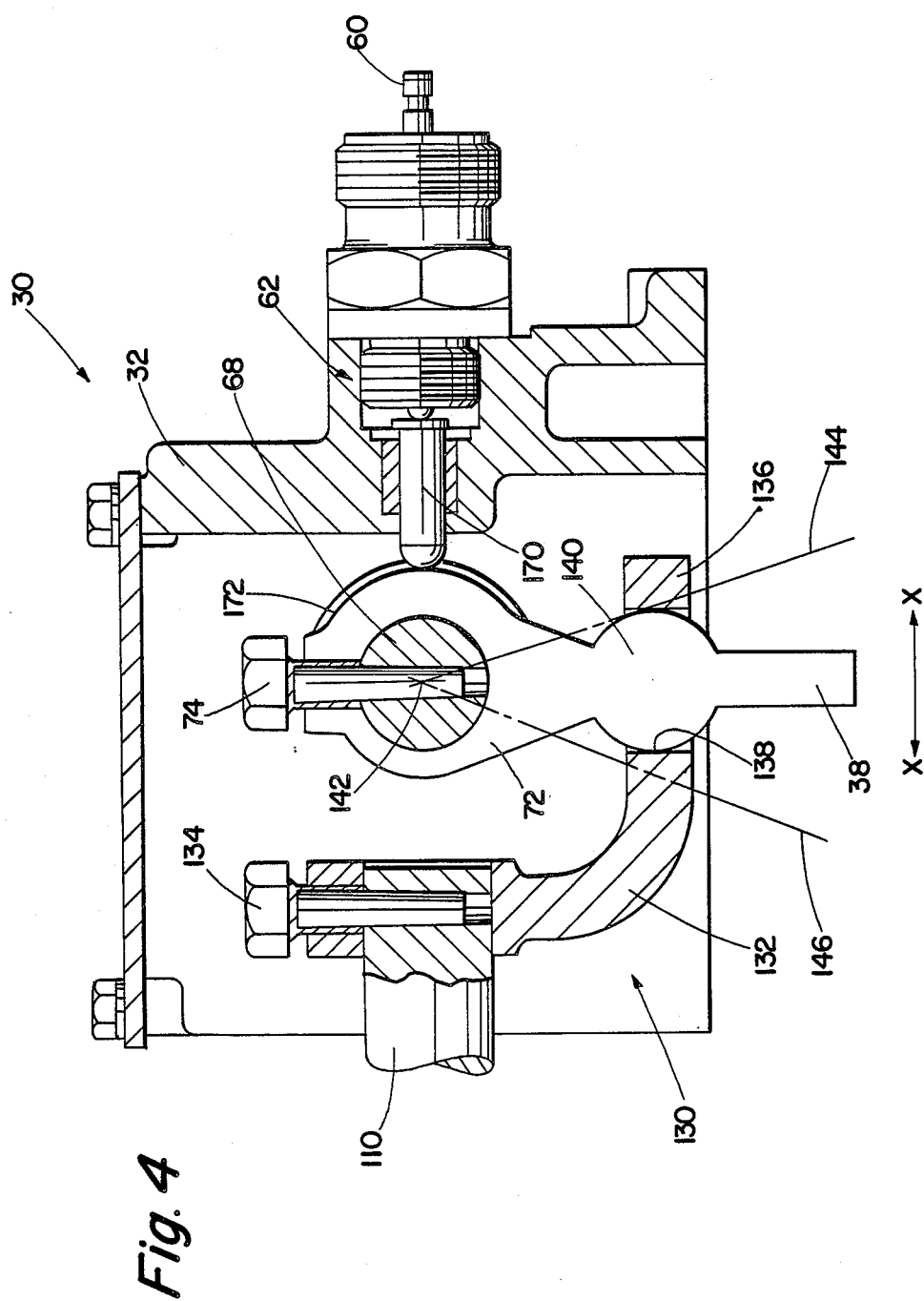
FIG. 4 is a partial sectional view of the X-Y shifting mechanism of the present invention taken substantially along line 4—4 in FIG. 2.

The structural details and the operation of X-Y shifter 30 is best appreciated by reference to the sectional drawings in FIGS. 3 and 4. The engagement/disengagement assembly 46 for moving shift finger 38 in the Y—Y axial direction comprises a shaft 68 supported as at sleeve bushings 70 for axial movement in the Y—Y direction, and pivotal movement, relative to housing 32. The shift finger 38 is integral with a shift finger carrier 72 axially and rotationally fixed to shaft 68 as by set screw 74.

Adjacent its upper end, a piston 76 is axially fixed to shaft 68 between a shoulder 78 and a nut and washer 80 retained on threaded upper extension 82 of shaft 68. Piston 76 is slidably and sealingly received within cylinder member 84 to define sealed chambers 86 and 88. A piston 90 is slidably and sealingly received within a cylinder member 92. The piston 90 and cylinder 92 define a sealed chamber 94 above the piston. Downward axial movement of piston 90 is limited by washer shaped stop member 96 having a central opening 98 allowing the lower surface 100 of piston 90 to fluidly communicate with and define chamber 88 and to contact extension 82 of shaft 68. Surface 100 of piston 90 will contact shaft 68 extension 82 when piston 90 is in its lowest most position and shift finger carrier 72 and shift finger 38 are in the neutral or axially nondisplaced condition as illustrated in FIG. 3. Piston 76 defines an upper and a lower surface 102 and 104, exposed to a pressure in chambers 88 and 86, respectively, which are smaller than the upper surface 106 and lower surface 100 of piston 90 exposed to fluid pressure in chambers 94 and 88, respectively. While surface 106 is equal in area to surface 100, at times when piston surface 100 is engaging stop member 96 or extension 82, the effective area of surface 106 exceeds that of surface 100.

The piston/cylinder assembly 46 allows shaft 68 to assume any selected one of three selectable axial positions, namely axially centered as illustrated in FIG. 3, an upward axial displacement wherein surface 102 will contact stop member 96 and a downward axial displacement wherein surface 104 contacts a stop member 108. The upward and downward displacements are selected in view of the required axial displacements of shift rails and associated shift forks to cause engagement and disengagement of transmission ratio gears.

To cause shaft 68 to assume its axially nondisplaced neutral position, chambers 94 and 86 are pressurized while chamber 88 is exhausted. To cause shift 68 to be displaced axially downwardly, chambers 88 and 94 are pressurized while chamber 86 is exhausted. It is noted that chamber 94 could be exhausted to achieve the same but somewhat slower downward displacement. To cause upward axial displacement of shaft 68, chamber 86 is pressurized while chambers 88 and 94 are exhausted.

Movement of shift finger 38 in the X—X direction to align the shift finger with a selected shift rail is accomplished by selective axial positioning of shaft 110 which is slidably supported in housing 32 as by bushing 112 for movement substantially perpendicular to the axial movement of shaft 68. Except for being somewhat smaller in size, shaft 110 and its associated piston/cylinder assembly 42 is substantially functionally and structurally identical to that of shaft 68 and associated piston/cylinder assembly 46 described above.

Briefly, piston 114 is fixed to shaft 10 and defines sealed chambers 116 on 118 on the right and left faces, respectively, thereof. A larger piston for contact with a leftwardly extending extension of shaft 110 has a rightwardly facing surface exposed to pressure in chamber 118 and a leftwardly facing surface defining and exposed to fluid pressure in a sealed chamber 122.

A first washer shaped stop member 124 limits rightward axial movement of piston 120 and leftward axial movement of piston 114. Stop member 126 limits rightward axial movement of piston 114.

As may be seen by reference to FIGS. 3 and 4, a crank mechanism 130 for pivoting shift finger in the X—X direction is controlled by shaft 110. A crank connector 132 is attached to shaft 110 as by set screw 134. The crank connector 132 includes a portion 136 axially offset but substantially parallel to shaft 110. Portion 136 defines a slot 138 for receipt of a generally bulbulous portion 140 defined by the shift finger carrier 72 to define a ball and slotted socket type connection. The carrier 72 and shift finger 38 are thus a crank lever, pivotably movable about the axis 142 of shaft 68.

In the axially centered position of shaft 110 shown is FIGS. 3 ad 4, shift finger 38 will align with the shift block 26 of shift rail 14. Movement of shaft 110 rightwardly will cause shift finger 38 to pivot to the position illustrated by phantom line 144 for alignment with shift block 28 of shift rail 16. Movement of shaft 110 leftwardly will cause the shift finger 38 to pivot to the position illustrated by phantom line 146 to align with shift block 24 of shift rail 12.

Pressurization of chambers 122 and 116 and exhaust of chamber 118 will cause shaft 110 to assume the axially centered position of FIG. 3. Pressurization of chamber 118, and preferably chamber 122, and exhaust of chamber 116 will cause shaft 110 to be axially displaced rightwardly. Pressurization of chamber 116 and exhaust of chambers 118 and 122 will cause shaft 110 to be displaced axially leftwardly.

Figure 6:
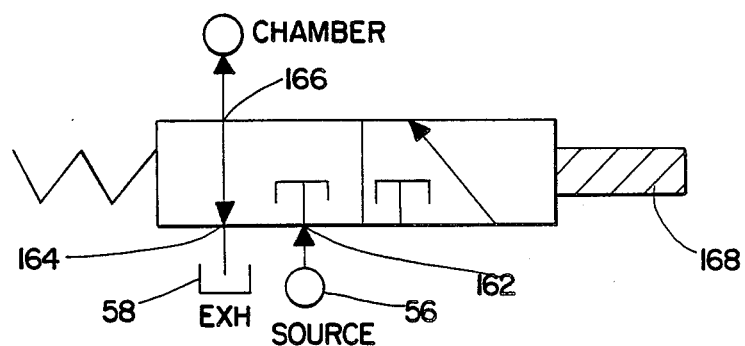
FIG. 6 is a schematic illustration of three-way two-position electrically controlled valves advantageously utilized in the X-Y shifting mechanism of the present invention.

Pressurization and exhaust of each of the individual chambers 94, 88, 86, 118 and 122, respectively, is controlled by one of the three-way two-position solenoid valves 150, 152, 154, 156, 158 and 160, respectively. The valves, as illustrated in FIG. 6, are of a standard type having a first port 162 connected to a common gallery 56 of pressurized fluid supplied by single-inlet connection 52, a second port 164 connected to common exhaust gallery 58 and a third port 166 connected to the individual chamber controlled by the valve. The valve is normally in the chamber exhaust position and, by action of the solenoid 160, is movable to the chamber pressurization position. Control of the various operating solenoids for the valves 150, 152, 154, 156, 158 and 160 is by the single electrical connector 50.

A spring biased detent plunger 170 cooperates with a detent groove 172 to resiliently bias the finger 38 in the neutral condition and cooperates with sensor 62 to provide a neutral signal to the transmission control unit.

It is noted that shaft 68, and thus shift finger 38, once positioned in a selective axial position will remain in that position even if all pressure to the various chambers is removed. Accordingly, especially if the shaft rails are provided with standard ingear and neutral detent devices, in the event of a pressure fluid failure, the X-Y shifter 30 will allow the engaged gear to remain engaged.

Although the present invention has been described with a certain degree of particularity, it is understood that the description is by way of example only and is not intended to be limiting. Various substitution and rearrangements of the components are possible without departing from the spirit and the scope of the invention as hereinafter claimed.

I claim:

1. An X-Y shifting mechanism (30) for controlling the shifting of mechanical change gear transmission of the type comprising a shift bar housing assembly (10) having three substantially parallel shift rails (12, 14, 16) axially movable in a first axial direction (Y—Y) in a shift bar housing, each of said rails having a shift fork (18, 20, 22) associated therewith and a block mechanism (24, 26, 28) engagable by the inner end of a manually operated shift lever movable in a second direction (X—X) substantially perpendicular to said first direction to be aligned with a selected one of said block mechanisms and in said first direction to move the selected one of said shift rails from a first axially nondisplaced position to a second position axially displaced in one direction along said first axis (Y—Y) or to a second position axially displaced in the opposite direction along said first axis;

said X-Y shifting mechanism (30) characterized by:
a shift mechanism housing (32), mountable to said shift bar housing at the opening thereof provided for said shift lever, a shift finger (38) extending from said X-Y shift mechanism housing (32) for extension through said opening and cooperation with said block mechanism;

a first shaft (68) axially movable in said first axial direction (Y—Y) in said shift mechanism housing, said shift finger (38) fixed to first shaft (68) for axial movement therewith, said shift finger pivotably movable about the axis of (142) said first shaft;

a second shaft (110) axially movable in said second axial direction (X—X) in said shift mechanism housing, said second shaft having means (132) axially movable therewith engaging said shift finger at a point (140) offset the axis (142) of said first shaft to a first position aligned with a first shift rail block mechanism, a second position aligned with a second shift rail block mechanism and a third position aligned with a third shift rail block mechanism;

a first electrically controlled pressurized fluid actuated control (46) for selectively positioning said first shaft in any selected one of three different selectable axial positions along said first axial direction, said first control comprising a first piston and cylinder assembly defining three (86, 88, 94) selectively pressurized first chambers and three electrically controlled first valves (150, 152, 154) for selectively independently pressurizing and exhausting said first chambers.

a second electrically controlled pressurized fluid actuated control (42) for selectively positioning said second shaft in any selected one of three different selectable axial positions along said second axial direction, said second control comprising a second piston and cylinder assembly defining three selectively pressurized and exhausted second chambers (116, 118, 122) and three electrically controlled second valves (156, 158, 160) for selectively independently pressurizing and exhausting said second chambers.

2. The X-Y shifting mechanism of claim 1, wherein each of said first and second valves has a first port (162) connected to a common source (56) of pressurized fluid, a second port (184) connected to an exhaust and a third port (166) connected to the chamber individually controlled thereby, said valves normally blocking said first port and fluidly communicating said second and third ports, said valves electrically controllable to assume a second position blocking said second port and fluidly communicating said first and third ports.

3. The X-Y shifting mechanism of claim 2 wherein said electrically controlled valves (150, 152, 154, 156, 158, 160) are solenoid (168) controlled valves.

4. The X-Y shifting mechanism of claim 2 wherein said common source of pressurized fluid (56) comprises a sealed gallery in said mechanism housing (32) having a single fluid connection (52) from said housing to a source of pressurized fluid.

5. The X-Y shifting mechanism of claim 4, wherein said source of pressurized fluid is an onboard vehicle air system.

6. The X-Y shifting mechanism of claim 3 wherein each of said valves has a first (180) and a second (182) electric connection, all of said first connections wired in series, a separate connection provided for each second connector (182) and a single exterior electric connector assembly (50) having at least seven independent connectors provided in said housing.

7. The X-Y shifting mechanism of claim 1, wherein said means (132) axially movable with said second shaft for contacting said shift finger (38) defines a slot (138) extending in said first axial direction for cooperation with a bulbous portion (140) defined on said shift finger.

8. The X-Y shifting mechanism of claim 1 wherein said shift finger (38) is rotatably fixed to said first shaft (68) and said first shift is pivotably supported in said housing.

9. The X-Y shifting mechanism of claim 1, wherein said first (68) and second (110) shafts are axially movable on a common plane and said means (132) axially movable with said second shaft comprises a crank connection.

10. The X-Y mechanism of claim 2 wherein all of said first and second valves (150, 152, 154, 156, 158, 160) are located within said housing (32).

* * * * *